Aug. 21, 1956    T. M. BLACKMON ET AL    2,759,356
WEIGHT AND BALANCE INDICATOR
Original Filed Nov. 13, 1945    4 Sheets-Sheet 1
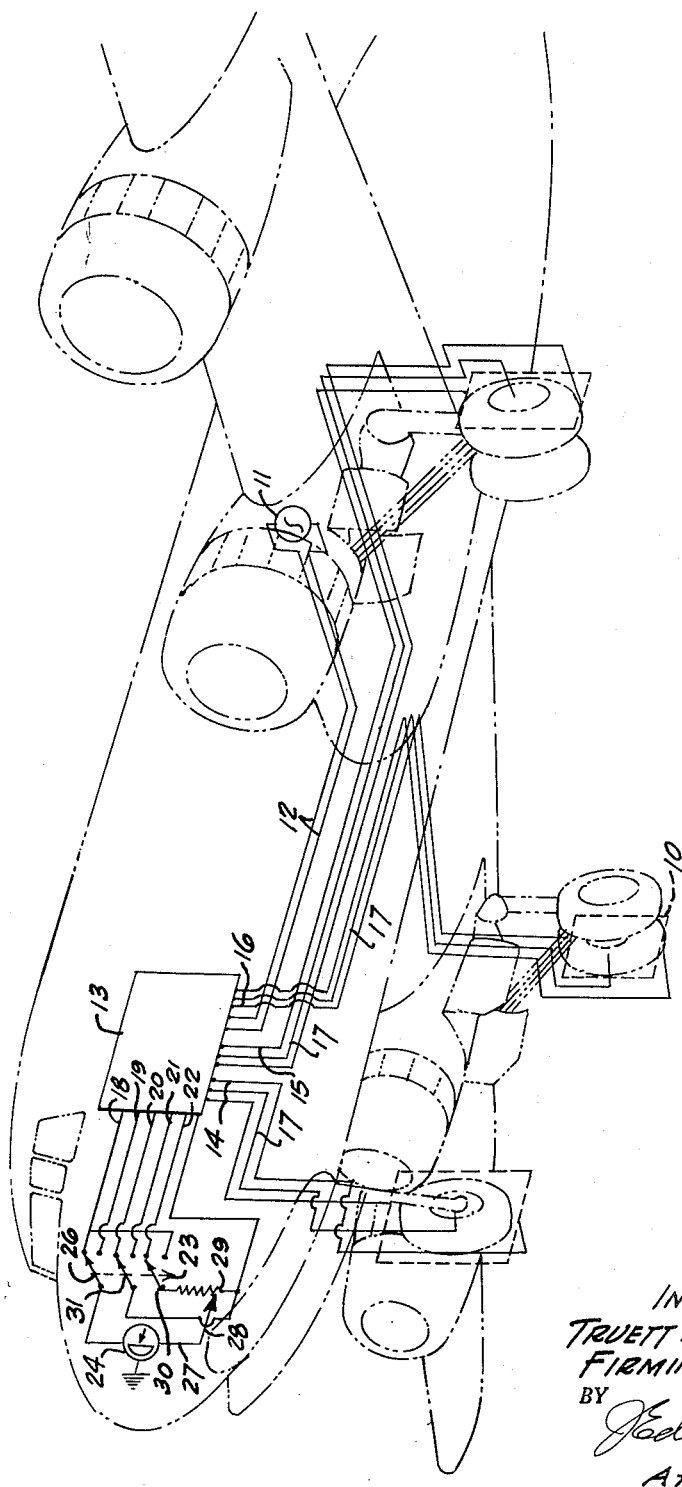
INVENTORS
TRUETT M BLACKMON AND
FIRMIN D. PORTER
BY
    J. Edwin Coates
        ATTORNEY.

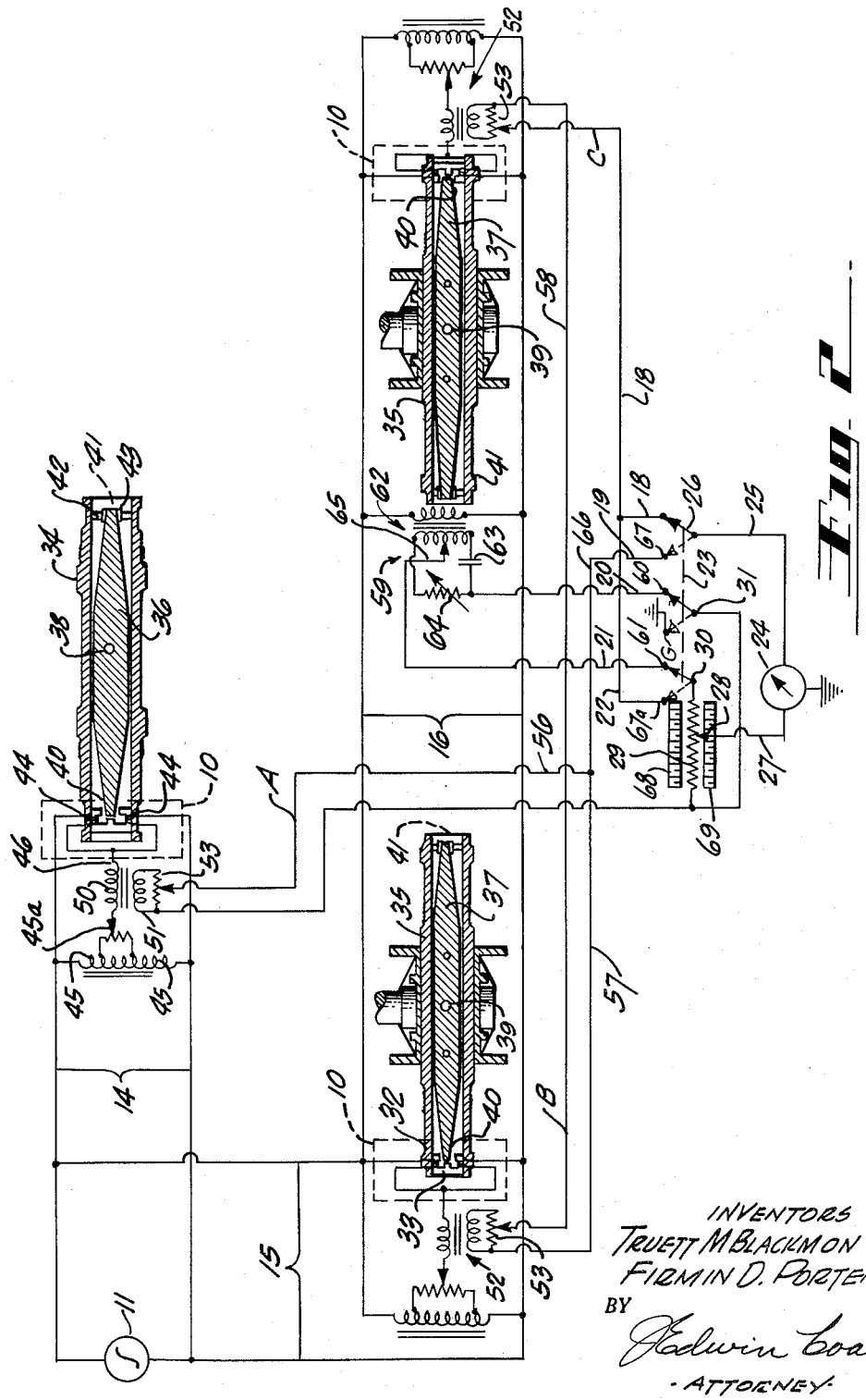

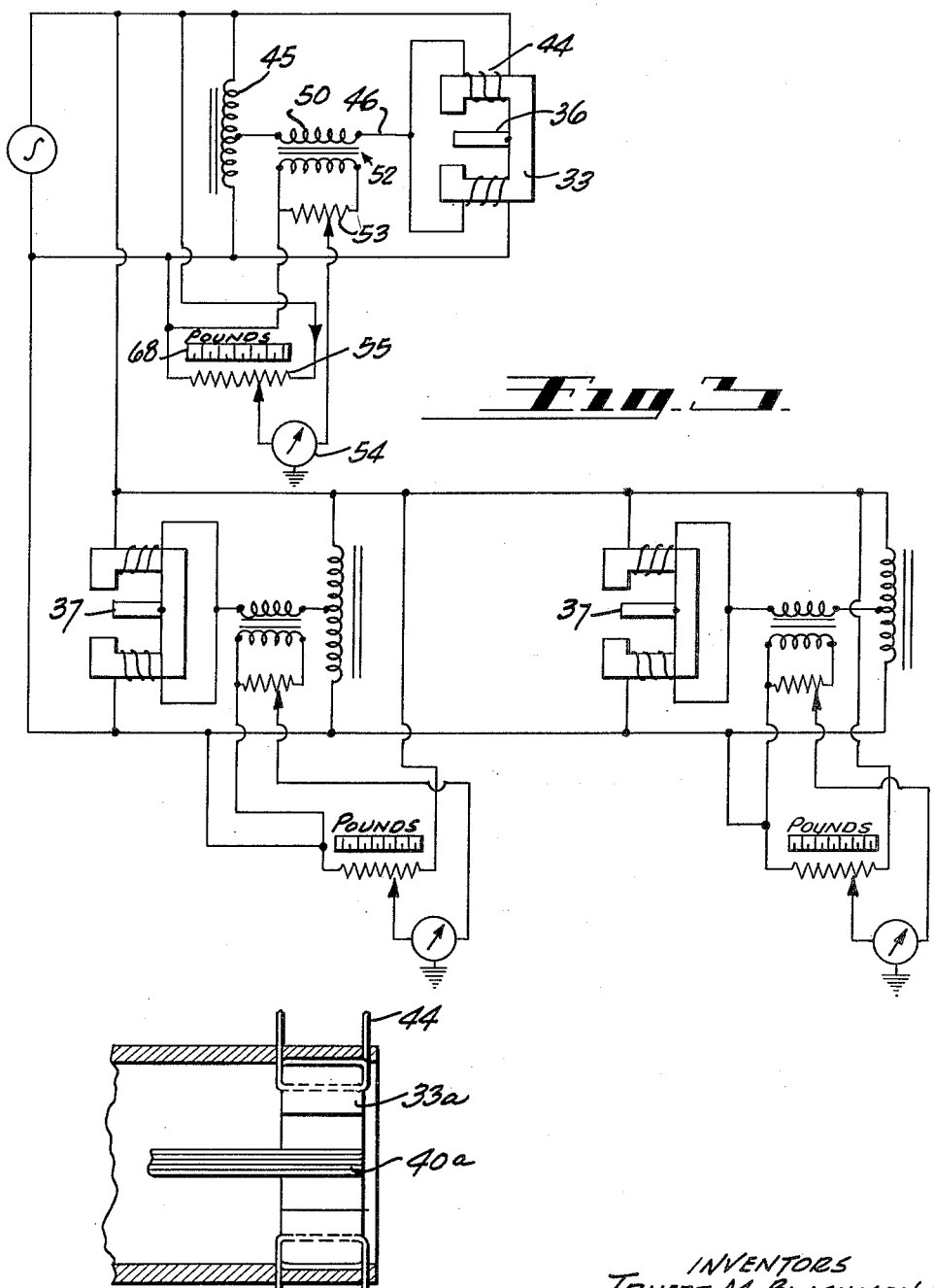

ered Aug. 21, 1956

2,759,356

WEIGHT AND BALANCE INDICATOR

Truett M. Blackmon, Sherman Oaks, and Firmin D. Porter, Venice, Calif., assignors to Douglas Aircraft Company, Inc., Santa Monica, Calif.

Original application November 13, 1945, Serial No. 628,190, now Patent No. 2,615,330, dated October 28, 1952. Divided and this application October 20, 1952, Serial No. 317,725

7 Claims. (Cl. 73—65)

This invention relates to apparatus for indicating the weight and balance conditions of a vehicle as they change during the loading of the vehicle. This application is a division of our application Serial No. 628,190, filed November 13, 1945, now Patent No. 2,615,330.

Devices of this general type are particularly useful in aircraft, for indicating at some suitable station, such as the pilot's cockpit or the baggage compartment, such loading-induced variables as the total weight of the aircraft, the longitudinal location of its center of gravity, or the weight on each of the landing wheels thereof for purposes of comparison. It is to be understood, however, that the present invention is by no means limited in the scope of its utility to employment with aircraft, being equally well applicable to automobiles and other conveyances as will become apparent hereinafter.

Previous devices of this general nature, and particularly those employed in connection with aircraft, are constructed to operate in response to loading-induced motions of, or pressure changes in, certain hydraulic components, such as the landing gear struts. Due to the alternate binding and releasing action of their packing glands and the variable behavior of the fluid in the struts, these motions are not linearly proportional to the load changes nor immediately responsive thereto, instead being discontinuous and quite jerky. The motivating force for actuating the indicating component of the apparatus hence being erratic, such apparatus is unpredictable and unreliable in operation.

Prior devices employing electrical means for effecting indication of the loading-induced variables of a vehicle are usually quite complex and delicate and hence unreliable.

It is the general object of this invention to provide a vehicle loading-indicating device which will be directly and continuously responsive to deflections of those structural components of the vehicle's ground-engaging members which undergo movement in direct linear proportion to the increments in loading of the vehicle, whereby immediate and continuous indication will be made of the changing weight and balance conditions effected by loading the vehicle.

It is a particular object of the invention to provide a device including relatively simple and reliable electrical means for electrically measuring the deflections of those components of the ground-engaging gear of vehicles which deflect linearly proportionately to the increments of loading on the vehicle, by causing them to actuate electrical indicating means, responsive to relative changes of electromagnetic fields associated with said load-deflectable components. The indicating means of the device may be constructed and calibrated as a single device for quantitatively evaluating changes in the weight and the longitudinal position of the center of gravity of the vehicle during loading, or may consist of separate indicators enabling mutual comparisons to obtain these values.

It is a specific object of the invention to provide a directly readable aircraft loading indicator which will be directly and immediately responsive to the flexures of the axles of the landing wheels of the aircraft. Independence from the relatively erratic actuating force furnished by movement of, or pressure changes in, such variably responsive means as hydraulic struts, or the like, is thus assured while enabling rapid and accurate indication of the total weight of the aircraft, or the longitudinal position of the center of gravity thereof; or the weight loading on each landing leg.

A further particular object of the invention is to provide a loading-indicating device of this improved nature, the calibration of which will remain dependable without recalibration for relatively long periods of time.

Still another particular object is to provide an indicating device of this type which will be substantially independent of the ground attitude of the craft or of side thrusts on the landing gear, and of thermal effects due either to altitude or climate.

Another particular object of the invention is to provide a device of this improved nature which will be relatively simple in construction and easy to install on the vehicle in a permanent location with all its parts carried in the vehicle.

With these and other objects in view, the invention essentially includes, in one of its presently preferred embodiments, a flexural element in each ground-engaging member of the vehicle, load-deflectable in linear proportion to increments of loading of the vehicle and changing the position of the armature of an electromagnetic displacement device associated with each ground-engaging member, the displacement device constituting one-half of a balanced bridge connected to the vehicle's energy source and to the other half of the bridge, the armature therefore functioning to unbalance the bridge. The output voltages of the thus unbalanced bridges are sensitivity equalized and inductively impressed upon one electrical side or the other, depending upon the indication sought, of a null-point sensitive volt meter, nullable on the other electrical side by a potentiometer energizable from the vehicle's energy source and mechanically connected to a dial calibrated in pounds to indicate loading and in percentages of the M. A. C. for indicating longitudinal positions of the center of gravity. The outputs of the bridges are rendered connectible to the volt meter and to the potentiometer in two different circuits, one of which effects addition in phase of the voltage outputs of the bridges to give an indication of the total weight, the other circuit effecting a bridge-ratio comparison of the voltage outputs from the forwardly located ground-engaging members and the rearwardly located ground-engaging members in such a way as to indicate the longitudinal position of the center of gravity of the vehicle. If desired, the voltage-responsive indicating devices may be separate and the readings from the forwardly located wheel or wheels compared by the vehicle operator to those from the rearwardly located wheels to obtain an evaluation of the longitudinal position of the center of gravity of the vehicles; or they may be added by him to indicate the total loading.

The invention also provides novel methods of ascertaining the loading of a vehicle and the longitudinal position of its center of gravity.

The other objects and accomplishments of the invention will be made manifest as this specification proceeds.

The invention is illustrated in the accompanying drawings, and described hereinafter, in connection with its embodiment in airplanes, but it is to be understood that the inventive concepts are limited in the embodiments they can assume, only by the scope of the annexed claims.

In these drawings:

Figure 1 is a fragmentary perspective of an airplane, diagrammatically illustrating the general arrangement therein of the presently preferred embodiment of the invention;

Figure 2 is a diagrammatic view of the apparatus showing the axles of the aircraft, and one form of displacement device therein in longitudinal section and illustrating respective circuits actuated thereby for alternatively integrating or comparing the bridge outputs;

Figure 3 is a diagrammatic view of a modification showing circuits for enabling individual comparison of the loading on each landing leg;

Figure 4 is a fragmentary detailed view of an axle showing a modified arrangement of the fixed and the movable members of the displacement device adapted to compensate for thermal expansion;

Figure 5:
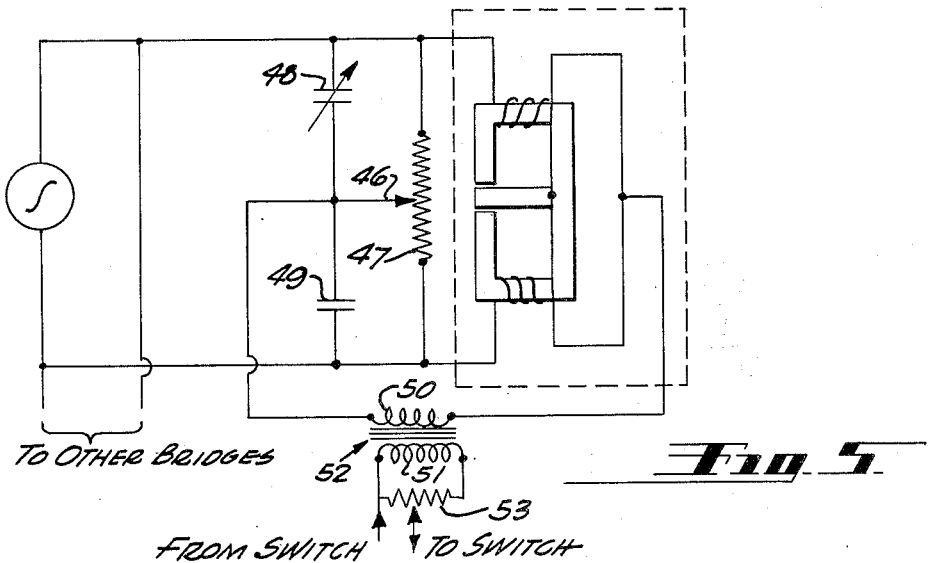
Figure 5 is a fragmentary diagrammatic representation of optional means for resistively and reactively balancing each bridge.

The invention will be exemplified in connection with its employment with a transport airplane having tricycle landing gear, and in its broad aspects, it is primarily predicated upon electrically measuring the deflections of the axles of the tricycle landing gear thereof, induced by increments of loading of the airplane. Preferably, the invention involves the employment of displacement devices associated with the axles and with balanced bridges adapted to be unbalanced by loading-induced deflections of the axles to impress voltages in summation or in ratio upon coordinated indicating devices adapted to indicate either the total loading, or the longitudinal position of the center of gravity, of the airplane.

In such embodiment, the general arrangement comprises electromagnetic displacement devices 10, one of these devices being associated with the axle of each landing wheel, the devices being electrically connected in parallel with each other and with the airplane's source of electrical energy 11. The connections comprise an operating circuit 12 leading from the energy source to a junction box 13, from which respective feeder circuits 14, 15, and 16 lead to the respective electromagnetic devices. Conductors 17, associated with bridge balancing and transformer coupling means, hereinafter detailed, also extend from the respective electromagnetic devices to the junction box.

The location of the junction box is a matter of preference, but can be advantageously situated in the baggage compartment just aft of the pilot's compartment. If desired, however, it may be advantageously located in the pilots' compartment.

From junction box 13, conductors 18, 19, 20, 21 and 22, respectively, associated with the respective bridges in a manner hereinafter described, lead forwardly to a three-pole, double throw switch 23 provided to enable connecting the indicating means 29 and 24, later detailed, into two different circuits with the bridges, in a manner hereinafter particularized, for respectively indicating the two different sets of loading conditions of the aircraft that the invention proposes to ascertain.

Switch 23 may be situated either in the pilot's compartment or in the baggage compartment, as desired. The indicating means 24 may consist of a simple A. C. null-point meter, a dynamometer type volt meter, a rectifier type d'Arsonval movement, a ratiometer, or, in cases where greater sensitivity may be required, a simple A. C. vacuum tube volt meter, electrically preceded by an amplifier. In any case, this meter is connected, at its weight-variable input side, to a pole 26 of the switch 23, the other side of the volt meter being connected by means of a conductor 27 and a variable contact 28 with an A. C. potentiometer 29 of the rotary slide wire type. As is later particularized, the slider of this potentiometer is mechanically coupled by respective actuating couplings to respective indicating dials for separately indicating the total loadings and the center of gravity position, of the airplane, as shown in Figure 2. The slide wire of the potentiometer is connected at one end to a switch pole 30, the other end of the slide wire being connectible to one side of the energy source. A switch pole 31 is adapted to supply energy thereto from the energy source when the switch is in its full line or rightward position.

Each of the displacement devices indicated within the broken line rectangle 10 preferably comprises a balanced, variable-impedance electromagnetic strain gauge 32, shown in Figure 2. The yokes or cores 33 of these electromagnetic displacement gauges are, as shown in Figure 2, fixedly attached to the inside of one end of each of the axles of the respective landing wheels. In the transport airplane chosen for illustrative purposes, the tricycle landing gear includes a nose wheel axle 34 and main wheel axles 35. These axles are of the kind adapted to flex upwardly immediately upon increments of loading of the airplane and continue flexing upwardly in direct proportion to these increments, in a linear manner.

However, it is to be understood that these yokes may equally well be attached to any other structural member of the landing gear that also undergoes immediate deflection in direct and linear proportion to increments in the weight loading on this structural member.

The armatures of the electromagnets of these displacement devices preferably take the form of elongated beams 36 and 37 having laminated extremities 40 and being pivotally mounted to the unloaded, or substantially rigid, portions of the nose wheel and main wheel axles, respectively. Since, in the airplane type shown, the nose wheel axle is asymmetrically loaded, a pivot 38 of the beam 36 in the nose wheel axle, is preferably located at a point laterally displaced from the longitudinal center of both the beam and the axle, for reasons hereinafter particularized, whereas the pivots 39 of the beams 37 in the main wheel axles coincide with the longitudinal centers of both the beam and the axle.

Thermally-induced effects on the field of the electromagnet caused by the change in length of the beams 36 and 37 may also be anticipated and compensated for in the manner shown in Figure 4, wherein the yokes 33a are mounted in the axles at right angles to the position they occupy in Figure 2. The yokeward ends 40a of the beams, in this instance are laminated and constructed of a uniform cross-section throughout their lengths, this section preferably being that of a square. The two halves of each yoke are symmetrical, so that thermally induced changes of yoke dimensions affect both air gaps equally and hence cause no unbalance of the bridges. Expansion and contraction of the beams thus has no effect upon the size of the air gaps and hence thermal influences effect no detrimental changes in the magnetic field. Constancy of performance of the electromagnet under all climatic or altitudinous conditions is thus obtained.

In either instance, the other end of each of the beams bears an aperture 41 through which extends the shank of an adjusting screw 42 bearing adjusting nuts 43 by means of which the disposition of the ends 40 may be altered upwardly or downwardly, that is longitudinally of the yokes, to vary the air gaps and the magnetic fields of the yokes, for a purpose hereinafter particularized.

In each main wheel 35, the weight of the airplane and its load is applied at the bottom of the axle and the ground reaction deflects both ends of the axle upwardly. Although the loading of the nose wheel in this particular type of airplane is asymmetric, both ends of this axle 34 are also deflected upwardly. Each of the beams is adapted to add the deflections occurring at the respective ends of the axles and refers the sum to the yoke end of the axle. As a consequence, only one gauge is required in each axle.

Each horizontal arm of each pick-up yoke is provided with an impedance coil 44, the reactance of each yoke being balanced yet variable, the respective yokes being connected in series to the source of energy by conductor paths 14, 15, and 16. Each of the circuits 14, 15, and 16 includes a reactor 45 connected in parallel across the conductor path and connected in divided circuit by a midpoint tap 45a to the connected impedance coils 44. The construction and arrangement of parts establishes, in association with each axle, a balanced, variable-impedance bridge, composed, in the illustrative embodiment shown, of the yoke 33 and coils 44, the conductor 46 and the dummy reactor 45 with variable center tap resistor 45a, the electromagnet constituting one-half of the bridge.

Figure 6:
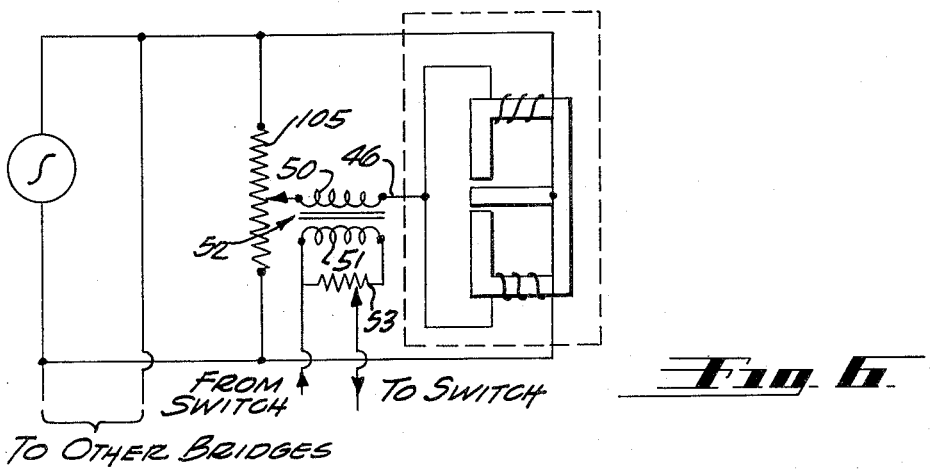
Figure 6 is a fragmentary diagrammatic view of another optional means for resistively and reactively balancing each bridge.

Reactive and resistive balance of each bridge is then preferably maintained by adjusting the nuts 43 at the end of each beam. The consequent variation in the disposition at the opposite ends 40 of the beams within the yoke, varies the air gap thereof and hence effects, through an alteration of the magnetic flux, an adjustment of the impedance in the impedance coils in such manner as to reestablish the balance of the unbalanced bridges. Resistive balance is maintainable in each bridge by suitable adjustment of the mid-point tap of the resistor 45a. However, the invention contemplates that, in cases where such may be found desirable, as shown in Figure 5, a variable potentiometer 47 and series connected variable and/or fixed capacitors 48 and 49 respectively, may be connected across the supply buses to the input side of the impedance coils of each bridge. In this case, potentiometer 47 is variably tapped and series connected to the output side of the impedance coils, by a conductor 46, through the capacitor circuit. This arrangement provides both resistive and reactive balance in the bridge. Reactive and resistive balance of each bridge may also be attained as shown in Figure 6, by mechanically balancing the armature of each displacement gauge with the adjusting screws described and employing a resistive potentiometer like the one designated by numeral 105 in the manner shown.

In either instance, the conductor 46 is rendered integral with a primary induction coil 50, which is inductively associated with a secondary induction coil 51, the two together establishing a transformer 52.

In order to enable equalization of the voltage outputs of the secondaries for equal increments of airplane loading, each secondary induction coil 51 includes a sensitivity equalizer or adjustable potentiometer 53 connected in parallel across the output terminals thereof. Respective conductor paths A, B, and C lead from the respective sensitivity equalizers toward the switch 23, volt meter 24, and indicating devices 68 69 in a manner and for a purpose hereinafter particularized.

The illustrated mode of taking off the voltage outputs of the bridges, while replaceable by equivalent modes, is the preferable form, as it enables mixing the bridge outputs in an easy manner to facilitate ascertaining both the loading and the center of gravity position of the airplane, by simple indicating devices and by a relatively small number of circuits thereto. This arrangement also enables the employment of sensitivity equalizers which, after the adjustment to the same absolute sensitivity in each bridge, may be hermetically sealed and remain without recalibration or other attention for long periods of time.

In the preferred embodiment all components of the bridges, save the displacement gauges, the reactors, and the transformer couplings, are advantageously locatable in the junction box 13.

Although it is preferable to employ a transformer coupling to take-off the voltage outputs of the bridges, the invention also contemplates the employment in their stead in each bridge, as shown in Figure 3, of a separate sensitive null-point volt meter 54 and a rotary slide wire poten-
tiometer 55 for individual indication of the loading-induced output of each bridge. The three readings may either be added by the pilot or freight master, or compared in ratio by him to determine either the total loading, or the center of gravity position, of the airplane.

By the aforesaid manipulation of the adjusting nuts and the reactor taps aforedescribed, the bridges are adapted to be brought into a balanced condition at the inception of the loading operations. Thus, the bridges at this juncture, that is, when the airplane is in the empty condition, produce zero output voltage. As the loading operations proceed, however, increments of load effect axle deflections, causing relative movement of the beams with respect to their yokes and varying the air gaps thereof. The resultant change in the magnetic fluxes of the electromagnets alters the impedance to the alternating current in the two impedance coils of each electromagnet in opposite directions and unbalances the bridge. A voltage is thereby impressed upon the primary of each coupling transformer in each bridge. If the switch 23 then occupies its rightward position, shown in full lines in Figures 1 and 2, the voltage output from the sensitivity equalizer of the nose wheel bridge is thereby impressed, via the conductors 56 and 57, upon the sensitivity equalizer 53 of the left hand main wheel, as shown in Figure 2. The compounded voltages lead therefrom through a conductor 58 to the sensitivity equalizer 53 of the right main wheel and thence through conductor 18 to the pole 26 of switch 23. Equal voltage outputs and equal increments of loading are assured by adjustment of the adjustable contacts of the sensitivity equalizers in the manner aforedescribed.

The phase of the voltage applied from the energy source to the slide wire is to be shifted in such manner as to throw it into phase with the outputs from the gauges, when any type of mentioned meter 24 except a ratiometer is employed. To this end, a phase-shift network generally designated in Figure 2 by reference numeral 59 has its input side connected in parallel with the common supply busses for all the bridges and its output end connected in series with switch contacts 60 and 61. The network chosen for purposes of exemplification includes a transformer 62, the primary of which is connected directly across the supply busses, the secondary thereof including a capacitor 63 and a variable resistor 64 and in divided circuit with contact 60 of the switch. A midpoint tap 65 is associated with the secondary of the transformer and is connected to contact 61 of the switch.

Regardless of the particular type of phasing means employed, with switch 23 in the rightward position, the voltage outputs of the three coupling transformers are added in phase at the weight-variable input side of the sensitivity meter 24, the sum being directly proportional to the loading of the airplane at any given stage of the loading operations.

With these relationships establishable in this manner, in order to ascertain the total loading of the airplane it is only necessary to place switch 23 in its rightward position and to manipulate the slider of the slide wire potentiometer or its equivalent to null the reading of the null-point meter 24. The loading of the airplane or other vehicle can then be directly read from a dial 68 calibrated in pounds and mechanically coupled to the slider of the slide wire potentiometer in the manner customary in these conventional indicating devices.

With switch 23 in its leftward position, shown in dotted lines in Figure 2, voltage induced in the sensitivity equalizers 53 of the nose wheel bridge is impressed, singly, upon contact 67 of switch 23 through conductors 56 and 66, designated together as 19 in Figure 1. Thence this voltage is applied through conductor 25 to the weight-variable input side of the volt meter 24. At the same time, the center arm is disconnected from contact 60 and contacted with the ground pole G, switch pole 30 occupies a disconnected position with reference to the supply line 21 from the energy source and is now connected with contact 67a of the switch. The slide wire 29 is thereby disconnected from the energy source to which it was initially connected via the phase-shifting means 59 and connected to the voltage from the bridge of the left hand wheel and from the bridge of the right main wheel via conductor 22. The compounded voltages are applied through contact 28 and conductor 27 to the resistance-variable input side of the meter 24.

With the circuits in this relationship, the rotary slide wire 29 is constituted a potentiometer with reference to the outputs of the nose wheel bridges and the main wheel bridges. When the potentiometer 29 is so adjusted as to null the volt meter, the pointer 28 will indicate the ratio between the sum of the outputs of the main wheel bridges and the output of the nose wheel bridge.

To ascertain the longitudinal position of the center of gravity of the airplane as a percentage of the mean aerodynamic chord, switch 23 is readily shifted to its leftward position, and the rotary slide wire is adjusted to null the volt meter. The position of the pointer 28 with respect to a dial 69, calibrated in percentage of the mean aerodynamic chord and also separately mechanically coupled to the slider of the slide wire, gives a direct indication of the longitudinal position of the center of gravity. Dial 69 is preferably calibrated with respect to the specific loading moments of the airplane and bears suitable marking indicating the safe loading limits of the airplane for maintaining stability.

Adjustment of the slider of the potentiometer 29 in nulling the volt meter 24 does not balance the bridges. It is therefore preferable that each gauge be constructed to have identical non-linearities of performance; or, more preferably, that they operate linearly over the entire range. With either of these conditions, it is advantageous to include a sufficient amount of molybdenum permalloy in each yoke to maintain the permeability of its iron circuit constant over all temperature conditions.

With the longitudinal centers of the main wheel beams located, as described, concentrically with the longitudinal center of their corresponding axles, uneven footing of the tires of the dual main wheels, although inducing variations in tire loads, will have no appreciable effect upon the deflections of the beams. For types of airplanes in which the nose wheel axle is asymmetrically loaded, the location of the fulcrum of the beam of the nose wheel displacement gauge at a point laterally offset from the center of both the beam and the axle, is highly advantageous in that it maintains the total deflections of the beam, referred to the yoke, substantially independent of side loads on the nose landing leg. In addition, relatively minute deflections of the axle produce, in such an arrangement, relatively large deflections of the beams, rendering the device sensitive to the slightest change of loading of the aircraft.

As manifested, the present invention is not limited to that embodiment in which the displacement device in the bridge is an electromagnetic type of strain gauge. However, such type is preferable for many reasons, among which is the fact that electromagnetic displacement devices of the present type have an effectively much longer gauge length than other types and hence will discern a smaller increment of loading than such devices as the resistance wire type of strain gauge.

The invention, as should now be clear, is also not limited to the employment therewith of a null-point volt meter and rotary slide wire to electrically measure the axle deflections in the manner aforedescribed, inasmuch as a direct reading galvanometer may be employed for this purpose if desired. However, the employment of the present null-point type of volt meter and rotary potentiometer is quite advantageous, inasmuch as a null-point volt meter permits a very wide swing of the needle, enabling a high degree of accuracy in indicating the bridge-ratio set up thereat in determining the position of the center of gravity.

Many refinements and ramifications of the preferred embodiment are included within the scope of the inventive concepts. For instance, intsead of being located as shown in Figure 1, all the components of the apparatus except the displacement gauges and the energy source, may be located at one and the same station in the airplane. That is, the junction box, switch, sensitivity meter, and rotary slide wire may be all located together either in the baggage compartment, for the convenience of the freight master, or in the pilot's compartment to enable him to supervise loading operations.

I claim:

1. In apparatus for determining the weight of a vehicle having ground-engaging means, a weight-responsive strain-gauge unit, including: a substantially hollow axle in the ground-engaging means adapted to be deflected in direct proportion to the weight of the vehicle; an elongate armature disposed coaxially in said axle and pivoted transversely thereto, one end of said armature undergoing relative movements with respect to said axle that are in direct proportion to the weight-caused deflections of said axle; electro-magnetic pick-up means mounted fixedly with respect to said axle operatively adjacent one end of said armature and adapted to emit a signal varying in strength in direct proportion to the relative movements of said armature; and weight indicating means in circuit with and actuated by said pickup means.

2. An indicating device comprising: means for supplying electrical energy; a plurality of means deflectible in direct proportion to increments of weight loading thereon; means electrically connected to the energy supply for establishing a plurality of normally balanced electrical bridges, each including the winding of an electromagnet; means displaceable relative to each of said windings by deflection of said deflectible means to unbalance and thereby set up a potential across the midpoints of the bridges; means inductively responsive to each of said potentials for producing proportionate potentials; a null point voltage meter; a slide wire potentiometer having a resistor; means for summating the inductively produced potentials and passing the summation through the meter to the potentiometer slider, thence through one end of the potentiometer resistor; and means subjecting the resistor to the supply potential; the movement of the slider to null the meter upon the occurrence of an unbalanced bridge indicating the weight causing such unbalance.

3. Apparatus for indicating the weight loading of a vehicle having a plurality of ground engaging means and a source of electrical energy, comprising: a first member in each of said ground engaging means flexurally responsive to increments of loading of the vehicle and having a non-flexing mid-point; a second member pivoted at the non-flexing mid-point of each of said first members and being immovable with respect to one end of said first member whereby the second member is relatively displaceable with respect to the other end of said first member by deflections of both ends of the first member, a free end of each second member being of magnetic material; an electromagnet fixedly mounted on said other end of each of said flexural members and magnetically affected by movement of said pivoted member; normally balanced bridge means, one path of each consisting of the windings of one of the electromagnets; means responsive to the potential across the bridge midpoints upon the unbalancing of the bridges due to flexure in the flexural members; and means indicating the summation of the effects on the potential responsive means.

4. In an indicating device, a hollow flexural member deflectable by increments of weight loading thereon; a source of electrical energy; an electromagnet including plural windings and an air gap fixedly mounted at one end of the flexural element and energized by said source; an elongate armature member pivotally supported within the flexural member at a non-flexing mid portion thereof and having one end extending into the air gap; a post carried by said flexural member at the other end of the flexural member passing transversely through said elongate member; adjusting nuts on the post to move the elongate member about its pivot whereby the position of the end of the elongate member within the air gap may be varied.

5. Apparatus for determining the weight of a vehicle, comprising: ground engaging means operatively associated with said vehicle; deflectible means operatively associated with said ground engaging means and deflecting in proportion to the vertical loads on said ground engaging means; a source of electrical energy; normally balanced bridge circuits connected to said source; strain gauges forming a first half of each of the bridges, said gauges including electromagnets and components carried by said deflectible means for varying voltages in the electromagnets; means inductively energized in response to the voltage across each of the bridge midpoints when said bridges become unbalanced due to voltage changes in the electromagnets; null point indicating means; a potentiometer including a slider and a resistance; conductor paths summating the outputs of the inductively energized means, passing the summation through the indicating means, the slider, and one terminal of the potentiometer resistance; a circuit from said energy source through the resistance of the potentiometer, whereby movements of the slider upon a change in output of the inductively energized means effects a nulling of the indicator means, said movements indicating the change in vehicle weight.

6. Apparatus for determining the weight of a vehicle, comprising: ground engaging means operatively associated with said vehicle; weight deflectible means in said ground engaging means; a source of electrical energy; normally balanced bridge circuits connected to said source, one side of each of said bridge circuits including a component having the voltage thereacross varied in proportion to the deflection in said weight deflectible means; means electrically connecting the equipotential midpoints of each of the balanced bridges; means inductively energized by the potential across the bridges when said bridges are unbalanced; nullpoint indicating means; a potentiometer having a slider and a resistance; conductor paths serially connecting the inductively energized means, impressing the output thereof through the indicating means, the slider, and one resistor terminal of the potentiometer; a circuit from said energy source through the resistor of the potentiometer whereby movement of the slider upon a change in output of the inductively energized means will null the reading of the indicating means.

7. Apparatus convertible from a weight indicator to a center of gravity indicator for use on vehicles, comprising: front and rear ground engaging means respectively spaced along the longitudinal axis of symmetry of the vehicle and fore and aft of the center of gravity thereof; weight deflectible means in each ground engaging means deflectible in direct proportion to the loads thereon; an electrical energy source; strain gauges energized by said source in each said weight deflectible means producing potentials proportionate to the loads; conductor paths summating the potentials; a null point meter; a potentiometer having a resistance and a slider to pick off the varying potential along the resistance; a double throw switch in one position connecting the energy source through the resistance of the potentiometer and connecting the summated potentials through the meter to the slider thence returning through one end of the resistance, said switch in its other position connecting the summated potentials through the resistance and connecting the meter in circuit with its one side subjected to the potential at the slider and its other side subjected to the potential produced by the strain gauges in the front ground engaging means, the position of the slider when the meter is nulled providing an indication of the weight and the relative postion of the center of gravity between said ground engaging means and along said axis of symmetry respectively of the vehicle in the first and other said positions of the switch.

References Cited in the file of this patent

UNITED STATES PATENTS

| | | |
|---|---|---|
| Re. 14,475 | Troll | May 21, 1918 |
| 1,407,078 | Murray | Feb. 21, 1922 |
| 1,864,876 | Westrum | June 28, 1932 |
| 2,159,373 | Dunn | May 23, 1939 |
| 2,260,036 | Kuehni | Oct. 21, 1941 |
| 2,276,817 | Bagno | Mar. 17, 1942 |
| 2,336,371 | Shayne et al. | Dec. 7, 1943 |
| 2,394,079 | Langer et al. | Feb. 5, 1946 |
| 2,540,807 | Berry | Feb. 6, 1951 |
| 2,559,718 | Goodlett et al. | July 10, 1951 |
| 2,577,691 | Shrader et al. | Dec. 4, 1951 |
| 2,615,330 | Blackmon et al. | Oct. 28, 1952 |

FOREIGN PATENTS

| | | |
|---|---|---|
| 215,986 | Great Britain | May 27, 1924 |